(No Model.)
J. R. NUNAMAKER & M. J. WILLIAMS.
COMBINED SPREADER AND REGULATOR FOR THRESHING MACHINES.
No 578,898. Patented Mar. 16, 1897.
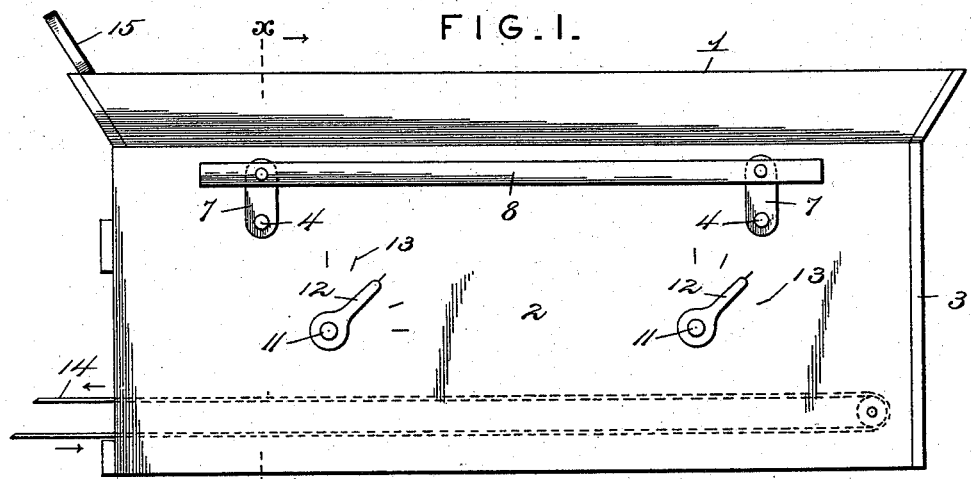
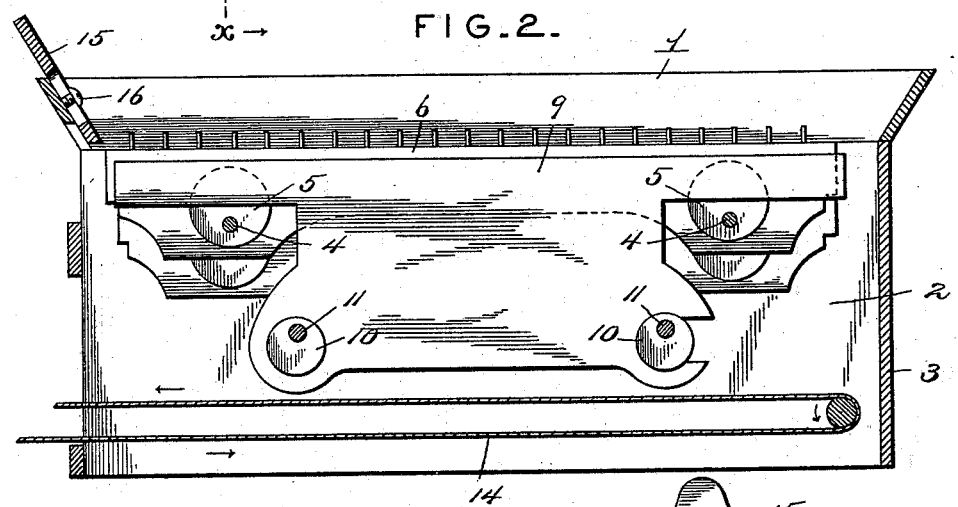
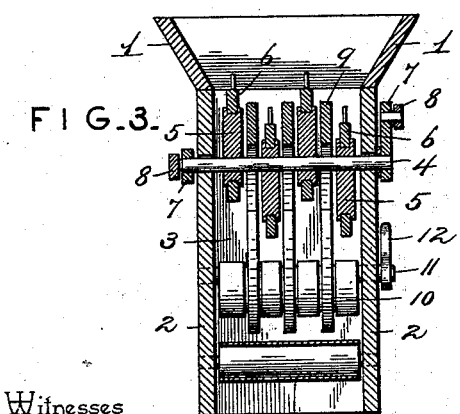
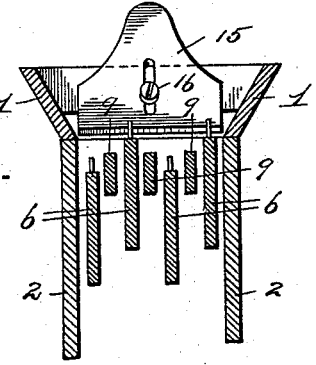
Witnesses
Harry L. Amer.
V. B. Hillyard.
Inventors
James R. Nunamaker
Marcellus J. Williams.
By their Attorneys,
C. A. Snow & Co.

UNITED STATES PATENT OFFICE.

JAMES R. NUNAMAKER AND MARCELLUS J. WILLIAMS, OF IONE, OREGON.

COMBINED SPREADER AND REGULATOR FOR THRESHING-MACHINES.

SPECIFICATION forming part of Letters Patent No. 578,898, dated March 16, 1897.

Application filed May 15, 1896. Serial No. 591,652. (No model.)

*To all whom it may concern:*

Be it known that we, JAMES R. NUNAMAKER and MARCELLUS J. WILLIAMS, citizens of the United States, residing at Ione, in the county of Morrow and State of Oregon, have invented a new and useful Combined Spreader and Regulator for Threshing-Machines, of which the following is a specification.

The purpose of this invention is the provision of an appliance for securing a uniform and regular feed of the grain to threshing-machines and to devise a construction which will loosen and lighten the grain and at the same time admit of the quantity being fed in a given time, to be varied according to the condition of the thresher and the nature of the grain to be operated upon.

With these and such other ends in view as pertain to the nature of the improvement the latter consists of certain details of construction and novel combinations of parts which hereinafter will be more particularly set forth, illustrated, and finally claimed.

The improvement is susceptible of various changes in the form, proportion, and the minor details of construction without departing from the principle or sacrificing any of the advantages thereof, and a full disclosure of the invention and adaptation thereof is shown in the accompanying drawings, in which—

Figure 1 is a side elevation of a feed-regulator for attaining the objects of this invention. Fig. 2 is a longitudinal section thereof. Fig. 3 is a cross-section on the line X X of Fig. 1. Fig. 4 is a detail view of the gate at the delivery end of the device.

Corresponding and like parts are designated in the following description and indicated in all the views of the drawings by the same reference-characters.

The framework of the structure is box-shaped and oblong and has a hopper at its upper end formed by boards or strips 1, outwardly flaring at their top edges and secured to or forming a part of the walls constituting the framework. The framework, which appears as a case, comprises side pieces 2 and an end piece 3, secured together in any desired way, and this framework is open at its rear or delivery end for the escape of the grain on its way to the thresher. Shafts 4 are journaled near the ends of the frame and are provided at intervals in their length with crank or eccentric portions 5, which are alternately related and disposed at diametrically opposite points. Bars 6, toothed along their upper edges, are mounted upon the crank or eccentric portions 5 and are actuated thereby upon rotating the shafts 4. By reason of the alternate disposition of the crank or eccentric portions 5 the alternate toothed bars 6 and the intermediate toothed bars will be caused to move in reverse directions, that is, while one set of bars are moving forward to advance the grain the other set are returning to a normal position to engage with and in turn feed the grain forward, said bars receiving a vertical and a longitudinal reciprocating motion, whereby their teeth are engaged with and withdrawn from the grain without dragging it. The shafts 4 are rotated in unison, and their radius-arms are connected by bars 8 to attain this end. Obviously any suitable mechanism for effecting a synchronous movement of the shafts may be resorted to.

A series of slats 9 alternate with and are placed between the toothed bars 6 and are capable of vertical adjustment to vary the distance to which the toothed edges of the bars 6 may project beyond the upper surfaces of the slats 9, thereby regulating the quantity of grain advanced at each forward stroke of the toothed bars. These slats 9 form, in effect, a vertically-adjustable bed and are mounted upon crank or eccentric portions 10 of shafts 11, journaled in the side pieces of the frame. By a proper adjustment or turning of the shafts 11 the bed or slats 9 can be moved to the required elevation for the purpose set forth.

In order to turn the shafts 11 easily in their bearings and that the relative adjustment thereof may be made known, arms 12 are secured to the projecting ends of the shafts, and marks 13 may be applied to the side pieces 2, so that upon moving the outer ends of the arms 12 to a point opposite any one of the marks 13 the required adjustment of the bed or slats can be had.

The slats 9 have their end portions extending over the shafts 4 and their middle portion widened and provided at one end with a circular bearing and at its opposite end with an elongated bearing, said bearings receiving the eccentric portions 10 of the shafts 11. By having one bearing circular positive connection is had between the slats and an adjusting-shaft, so as to prevent any longitudinal play of the slats, and by having the other bearing elongated provision is had for varying the distance between the eccentrics 10, thereby admitting of either shaft being turned when it is required to elevate or lower one end of the slats only. By widening the middle portion of the slats the shafts 11 are located in a lower plane than the shafts 4 and are out of the way of the action of the eccentrics 5.

An endless carrier 14 is arranged to travel beneath the bed and toothed bars, its upper portion moving toward the thresher, so as to carry the grain thereto. It is not absolutely necessary that the carrier extend beneath the slats or bed 9, but it is preferable, so as to make provision for catching the grain which may fall through the spaces between the elementary parts comprising the said bed.

A gate 15 is located at the rear or delivery end of the frame and is adjustable vertically to regulate the distance between its bottom edge and the upper portion of the slats or bed 9, whereby provision is had for a uniform discharge or escape of the grain upon the endless carrier 14, so that a regular supply to the thresher is insured.

Any suitable means may be employed for adjusting the gate and securing it in its located position, and, as shown, the gate is vertically slotted and a binding-screw 16 operates through the slot and enters the adjacent portion of the framework to attain the desired end.

The operating parts of the device may be actuated by any suitable means having connection with a convenient portion of the thresher, and when the invention is in service the grain is dropped into the hopper at the time of unloading the wagon or may be supplied thereto in any of the usual ways, and as the toothed bars reciprocate they will engage with the grain at the bottom of the pile and advance the same step by step toward the delivery end of the device, and by a proper adjustment of the gate 15 and the bed 9 the required amount will be delivered upon the endless carrier 14 and moved thereby to the thresher, thereby insuring a regular, positive, and continuous supply which can be varied without shutting down or stopping either the thresher or the feeder.

Having thus described the invention, what is claimed as new is—

1. In a feeder for threshing-machines, the combination with toothed bars, of a bed comprising a series of slats disposed alternately with the toothed bars, and means for supporting the bed at each end and admitting of the ends of the bed being independently or simultaneously adjusted vertically, substantially as set forth.

2. In a feeder for threshing-machines, the combination with the feeding mechanism comprising a series of elements disposed in parallel relation, of a series of slats forming a bed and alternating with the elements of the feeding mechanism, shafts having eccentric portions upon which the slats of the bed are mounted, a bearing of each slat being elongated longitudinally to admit of the effective distance between the eccentric portions varying when adjusting either end of the bed, and means for turning the shafts independently to raise or lower one or both ends of the bed, substantially as and for the purpose set forth.

3. In a feeder for threshing-machines, the combination of toothed bars, parallel shafts having eccentric portions upon which are mounted the end portions of the toothed bars, slats alternating with and arranged between the toothed bars and having their middle portions widened, and having the widened portions provided at one end with circular bearings and at the opposite end with elongated bearings, shafts arranged in a lower plane than the first-mentioned shafts and having eccentric portions mounted in the bearings of the widened portions of the slats, and means for independently turning the last-mentioned shafts for adjusting the slats vertically, substantially as and for the purpose set forth.

In testimony that we claim the foregoing as our own we have hereto affixed our signatures in the presence of two witnesses.

JAMES R. NUNAMAKER.
MARCELLUS J. WILLIAMS.

Witnesses:
J. W. MORROW,
J. WOODLERY.